(12) United States Patent
Guo

(10) Patent No.: US 11,043,002 B2
(45) Date of Patent: Jun. 22, 2021

(54) OBSTACLE DETECTING METHOD AND OBSTACLE DETECTING APPARATUS BASED ON UNMANNED VEHICLE, AND DEVICE, AND STORAGE MEDIUM

(71) Applicant: Baidu Online Network Technology (Beijing) Co., Ltd., Beijing (CN)

(72) Inventor: Jiang Guo, Beijing (CN)

(73) Assignee: BAIDU ONLINE NETWORK TECHNOLOGY CO., LTD., Beijing (CN)

( * ) Notice: Subject to any disclaimer, the term of this patent is extended or adjusted under 35 U.S.C. 154(b) by 203 days.

(21) Appl. No.: 16/512,940

(22) Filed: Jul. 16, 2019

(65) Prior Publication Data

US 2019/0340781 A1    Nov. 7, 2019

(30) Foreign Application Priority Data

Sep. 7, 2018  (CN) .......................... 201811044542.3

(51) Int. Cl.
```
G06T 7/70      (2017.01)
G01S 17/89     (2020.01)
G06K 9/00      (2006.01)
```
(52) U.S. Cl.
CPC ............. *G06T 7/70* (2017.01); *G01S 17/89* (2013.01); *G06K 9/00805* (2013.01);
(Continued)

(58) Field of Classification Search
CPC ....... G06T 7/70–77; G06T 2207/10028; G06T 2207/30261; G06T 2207/30252;
(Continued)

(56) References Cited

U.S. PATENT DOCUMENTS 8,060,271 B2 * 11/2011  Dolgov .............. G06K 9/00791
                                                     701/28
8,736,463 B1    5/2014  Zhu
(Continued)

FOREIGN PATENT DOCUMENTS

CN      101549683 A      10/2009
CN      102034104 A       4/2011
(Continued)

OTHER PUBLICATIONS

Zhao, Gangqiang, and Junsong Yuan. "Curb detection and tracking using 3D-LIDAR scanner." 2012 19th IEEE International Conference on Image Processing. IEEE, 2012. (Year: 2012).*
(Continued)

*Primary Examiner* — Geoffrey E Summers
(74) *Attorney, Agent, or Firm* — Harness, Dickey & Pierce, P.L.C.

(57) ABSTRACT

The application provides an obstacle detecting method and obstacle detecting apparatus based on an unmanned vehicle, and a device, and a storage medium, where the method includes obtaining point cloud data collected by a detecting device, projecting the point cloud data onto a two-dimensional plane to obtain a two-dimensional projection grid graph, where the two-dimensional projection grid graph has multiple grids and two-dimensional data, and two-dimensional data is data obtained after the point cloud data is projected; generating multiple straight lines according to the two-dimensional projection grid graph, where each of the multiple straight lines has two-dimensional data, and each straight line has parameter information which represents the relationship between the straight line and other straight lines in the multiple straight lines; and determining orientation information of the obstacle according to the two-dimen-
(Continued)

sional data and the parameter information of each of the multiple straight lines.

18 Claims, 5 Drawing Sheets

(52) U.S. Cl.
CPC .............. *G06T 2207/10028* (2013.01); *G06T 2207/20061* (2013.01); *G06T 2207/30261* (2013.01)

(58) Field of Classification Search
CPC ... G06T 2207/2207; G06T 2207/30248; G06T 2207/20021; G06T 2207/20061; G06T 2207/10044; G01S 13/42; G01S 13/89; G01S 13/93; G01S 13/931; G01S 17/93; G01S 17/42; G01S 17/89; G01S 17/894; G01S 17/931; B60W 2420/52; B60W 10/00–30/00; B60W 50/16; B60W 60/005–60/0061; B60W 2300/00–2530/213; B60W 2540/041–2540/049; B60W 2552/00–2556/65; B60W 2710/00–2720/406; B60W 2754/00–2900/00; G05D 1/0088; G06K 9/00791; G06K 9/00805; G06K 9/4633
See application file for complete search history.

(56) References Cited

U.S. PATENT DOCUMENTS

| | | | |
|---|---|---|---|
| 9,014,903 B1* | 4/2015 | Zhu | G01S 13/931 701/28 |
| 2001/0018640 A1* | 8/2001 | Matsunaga | G06K 9/4633 701/301 |
| 2009/0169052 A1* | 7/2009 | Seki | G06T 7/74 382/103 |
| 2019/0236381 A1* | 8/2019 | Rochan Meganathan | G06K 9/00201 |

FOREIGN PATENT DOCUMENTS

| | | |
|---|---|---|
| CN | 105223583 B | 6/2017 |
| CN | 107729856 A | 2/2018 |
| CN | 107885224 A | 4/2018 |
| GB | 2500772 A | 2/2013 |
| JP | 1985169983 A | 9/1985 |
| WO | 2018101631 A2 | 6/2018 |

OTHER PUBLICATIONS

Qin Lijuna et al; Novel algorithm for real-time pose estimation from line correspondences based on geometric constraints; CN J Scientific Instrument; V 27, No. 6, Jun. 2006.

* cited by examiner

OBSTACLE DETECTING METHOD AND OBSTACLE DETECTING APPARATUS BASED ON UNMANNED VEHICLE, AND DEVICE, AND STORAGE MEDIUM

CROSS-REFERENCE TO RELATED APPLICATION

This application claims priority to Chinese Patent Application No. 201811044542.3, filed on Sep. 7, 2018, which is hereby incorporated by reference in its entirety.

TECHNICAL FIELD

The embodiments of the present disclosure relate to the field of unmanned vehicles, and in particular, to an obstacle detecting method and obstacle detecting apparatus based on an unmanned vehicle, and a device, and a storage medium.

BACKGROUND

With the development of intelligent technology, unmanned vehicles have got adequately development and wide application. During the driving of the unmanned vehicle, it is necessary to detect the orientation of the obstacle around the unmanned vehicle.

In the prior art, the point cloud data can be collected by means a laser radar, and fitted to obtain an outer contour, then the direction indicated by the longest side of the outer contour is taken as the orientation of the unmanned vehicle.

However, the prior art method that is used to detect the orientation of the obstacle cannot accurately obtain the orientation by a fitting process, so that the correct orientation of the obstacle cannot be acquired.

SUMMARY

The embodiments of the present application provide an obstacle detecting method and obstacle detecting apparatus based on an unmanned vehicle, and a device, and a storage medium which are used to solve the problem that the orientation of the obstacle cannot be correctly determined in the above solution.

The first aspect of the present application provides an obstacle detecting method based on an unmanned vehicle, including:

obtaining point cloud data collected by a detecting device, where the point cloud data is data obtained after an obstacle around the unmanned vehicle is detected by the detecting device;

projecting the point cloud data onto a two-dimensional plane to obtain a two-dimensional projection grid graph, where the two-dimensional projection grid graph has multiple grids and two-dimensional data, and the two-dimensional data is data obtained after the point cloud data is projected;

generating multiple straight lines according to the two-dimensional projection grid graph, where each of the multiple straight lines has at least one of two-dimensional data, and the each straight line has parameter information which represents a relationship between the straight line and other straight lines in the multiple straight lines; and determining orientation information of the obstacle according to the two-dimensional data and the parameter information of the each of the multiple straight lines.

Further, the projecting the point cloud data onto a two-dimensional plane to obtain a two-dimensional projection grid graph includes:

projecting the point cloud data onto the two-dimensional plane to obtain a two-dimensional projection graph, where the two-dimensional projection graph has the two-dimensional data; and performing gridding processing on the two-dimensional projection graph to obtain the two-dimensional projection grid graph.

Further, the generating multiple straight lines according to the two-dimensional projection grid graph includes:

for each grid of the two-dimensional projection grid graph, if there is two-dimensional data in the grid, assigning the grid a first value;

for each grid of the two-dimensional projection grid graph, if there is no two-dimensional data in the grid, assigning the grid a second value; and generating the multiple straight lines according to the grid with the first value.

Further, the for each grid of the two-dimensional projection grid graph, if there is two-dimensional data in the grid, assigning the grid a first value includes:

for each grid of the two-dimensional projected grid graph, if there is the two-dimensional data in the grid, assigning the grid the first value according to a number of two-dimensional data in the grid, where the number of two-dimensional data is proportional to the first value.

Further, the generating the multiple straight lines according to the grid with the first value includes:

connecting at least two grids with the first value as a straight line to generate the multiple straight lines.

Further, the generating the multiple straight lines according to the grid with the first value includes:

performing Hough line detection on the two-dimensional projection grid graph according to the grid with the first value, to obtain the multiple straight lines.

Further, the determining orientation information of the obstacle according to the two-dimensional data and the parameter information of the each of the multiple straight lines includes:

determining, according to the two-dimensional data and parameter information of the each of the multiple straight lines, an orientation confidence value of the each straight line; and determining direction information indicated by a straight line having a largest orientation confidence value as the orientation information of the obstacle.

Further, the determining, according to the two-dimensional data and parameter information of the each of the multiple straight lines, an orientation confidence value of the each straight line includes:

determining, for the each straight line, an intersecting straight line intersecting with the each straight line, where the parameter information of the each straight line is an angle and an intersection point between the each straight line and each intersecting straight line corresponding to the each straight line; and determining an angle parameter of the each straight line according to angle values of all angles of the each straight line;

determining a position parameter of the each straight line according to position information of all intersecting points of the each straight line;

determining a distance between a first grid on the each straight line and the last grid on the each straight line as a distance parameter of the each straight line; and determining the orientation confidence value of the each straight line according to the number of two-dimensional data on the each straight line, the angle parameter, the position parameter, and the distance parameter.

Further, the determining an angle parameter of the each straight line according to angle values of all angles of the each straight line includes:

obtaining the angle parameter of the each straight line by performing a weighted summation on the angle values of all the angles of the each straight line.

Further, the determining a position parameter of the each straight line according to position information of all intersecting points of the each straight line includes:

obtaining the position parameter of the each straight line by performing a weighted summation on the position information of all the intersecting points of the each straight line.

Further, the determining the orientation confidence value of the each straight line according to the number of two-dimensional data on the each straight line, the angle parameter, the position parameter, and the distance parameter includes:

obtaining the orientation confidence value of the each straight line by performing a weighted summation on the number of two-dimensional data on the each straight line, the angle parameter, the position parameter, and the distance parameter.

The third aspect of the present application provides an obstacle detecting apparatus based on an unmanned vehicle, including:

an obtaining unit, configured to obtain point cloud data collected by a detecting device, where the point cloud data is data obtained after an obstacle around the unmanned vehicle is detected by the detecting device;

a projecting unit, configured to project the point cloud data onto a two-dimensional plane to obtain a two-dimensional projection grid graph, where the two-dimensional projection grid graph has multiple grids and two-dimensional data, and the two-dimensional data is data obtained after the point cloud data is projected;

a generating unit, configured to generate multiple straight lines according to the two-dimensional projection grid graph, where each of the multiple straight lines has at least one of two-dimensional data, and the each straight line has parameter information which represents a relationship between the straight line and other straight lines in the multiple straight lines; and a determining unit, configured to determine orientation information of the obstacle according to the two-dimensional data and the parameter information of the each of the multiple straight lines.

Further, the projecting unit includes:

a projecting module, configured to project the point cloud data onto the two-dimensional plane to obtain a two-dimensional projection graph, where the two-dimensional projection graph has the two-dimensional data;

a gridding module, configured to perform gridding processing on the two-dimensional projection graph to obtain the two-dimensional projection grid graph.

Further, the projecting unit includes:

a first processing module, configured to, for each grid of the two-dimensional projection grid graph, if there is two-dimensional data in the grid, assign the grid a first value;

a second processing module, configured to, for each grid of the two-dimensional projection grid graph, if there is no two-dimensional data in the grid, assign the grid a second value; and a generating module, configured to generate the multiple straight lines according to the grid with the first value.

Further, the first processing module is specifically configured to for each grid of the two-dimensional projected grid graph, if there is the two-dimensional data in the grid, assign the grid the first value according to a number of two-dimensional data in the grid, where the number of two-dimensional data is proportional to the first value.

Further, the generating module is specifically configured to connect at least two grids with the first value as a straight line to generate the multiple straight lines.

Further, the generating module is specifically configured to perform Hough line detection on the two-dimensional projection grid graph according to the grid with the first value, to obtain the multiple straight lines.

Further, the determining unit includes:

a first determining module, configured to determine, according to the two-dimensional data and parameter information of the each of the multiple straight lines, an orientation confidence value of the each straight line; and a second determining module, configured to determine direction information indicated by a straight line having a largest orientation confidence value as the orientation information of the obstacle.

Further, the first determining module includes:

a first determining submodule, configured to determine, for the each straight line, an intersecting straight line intersecting with the each straight line, where the parameter information of the each straight line is an angle and an intersection point between the each straight line and each intersecting straight line corresponding to the each straight line; and a second determining submodule, configured to determine an angle parameter of the each straight line according to angle values of all angles of the each straight line; and a third determining submodule, configured to determine a position parameter of the each straight line according to position information of all intersecting points of the each straight line;

a fourth determining submodule, configured to determine a distance between a first grid on the each straight line and the last grid on the each straight line as a distance parameter of the each straight line; and a fifth determining submodule, configured to determine the orientation confidence value of the each straight line according to the number of two-dimensional data on the each straight line, the angle parameter, the position parameter, and the distance parameter.

Further, the second determining submodule is specifically configured to obtain the angle parameter of the each straight line by performing a weighted summation on the angle values of all the angles of the each straight line.

Further, the third determining submodule is specifically configured to obtain the position parameter of the each straight line by performing a weighted summation on the position information of all the intersecting points of the each straight line.

Further, the fifth determining submodule is specifically configured to obtain the orientation confidence value of the each straight line by performing a weighted summation on the number of two-dimensional data on the each straight line, the angle parameter, the position parameter, and the distance parameter.

The third aspect of the present application provides a control device including: a transmitter, a receiver, a memory, and a processor;

the memory is configured to store computer instructions; the processor is configured to execute the computer instructions stored in the memory to implement the obstacle detecting method based on an unmanned vehicle according to any implementation of the first aspect.

The fourth aspect of the present application provides a storage medium, including: a readable storage medium and computer instructions, the computer instructions being stored in the readable storage medium; the computer instructions are used for implementing the obstacle detecting method based on an unmanned vehicle according to any implementation of the first aspect.

In this application embodiment, an obstacle detecting method and obstacle detecting apparatus based on an unmanned vehicle, and a device, and a storage medium are provided, by proposing the following steps: obtaining point cloud data collected by a detecting device, where the point cloud data is data obtained after an obstacle around the unmanned vehicle is detected by the detecting device; projecting the point cloud data onto a two-dimensional plane to obtain a two-dimensional projection grid graph, where the two-dimensional projection grid graph has multiple grids and two-dimensional data, and two-dimensional data is data obtained after the point cloud data is projected; generating multiple straight lines according to the two-dimensional projection grid graph, where each of the multiple straight lines has at least one of two-dimensional data, and each straight line has parameter information which represents the relationship between the straight line and other straight lines in the multiple straight lines; and determining orientation information of the obstacle according to the two-dimensional data and the parameter information of each of the multiple straight lines, a method for determining the orientation of an obstacle is provided, where a two-dimensional projection grid graph is obtained according to the point cloud data of the obstacle, and the orientation information of the obstacle is calculated according to the straight line obtained in the two-dimensional projection grid graph, which can therefore accurately determine the orientation of the obstacle around the unmanned vehicle and help the unmanned vehicle to keep clear of the obstacle.

DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description illustrate some embodiments of the present application, and those skilled in the art may still derive other drawings from the accompanying drawings without any creative effort.

DESCRIPTION OF EMBODIMENTS

In order to make the objective, technical solution and advantages of the embodiments of the present application more clear, the technical solutions in the embodiments of the present application are clearly and completely described in the following with reference to the accompanying drawings in the embodiments of the present application. It is apparent that the described embodiments are part rather than all of the embodiments of the present application. All other embodiments obtained by a person of ordinary skill in the art based on the embodiments of the present application without inventive efforts fall into the scope of the present application.

In the prior art, the point cloud data can be collected by means a laser radar, and fitted to obtain an outer contour, then the direction indicated by the longest side of the outer contour is taken as the orientation of the unmanned vehicle, where the unmanned vehicle is also called an autonomous vehicle.

However, the prior art method that is used to detect the orientation of the obstacle cannot accurately obtain the orientation by a fitting process, so that the correct orientation of the obstacle cannot be acquired.

In view of the above problems, the present application proposes an obstacle detecting method and obstacle detecting apparatus based on an unmanned vehicle, and a device, and a storage medium, which can accurately determine the orientation of the obstacle around the unmanned vehicle, and thus can help the unmanned vehicle to keep clear of the obstacle. The solution will be described in detail below through several specific embodiments.

Figure 1:
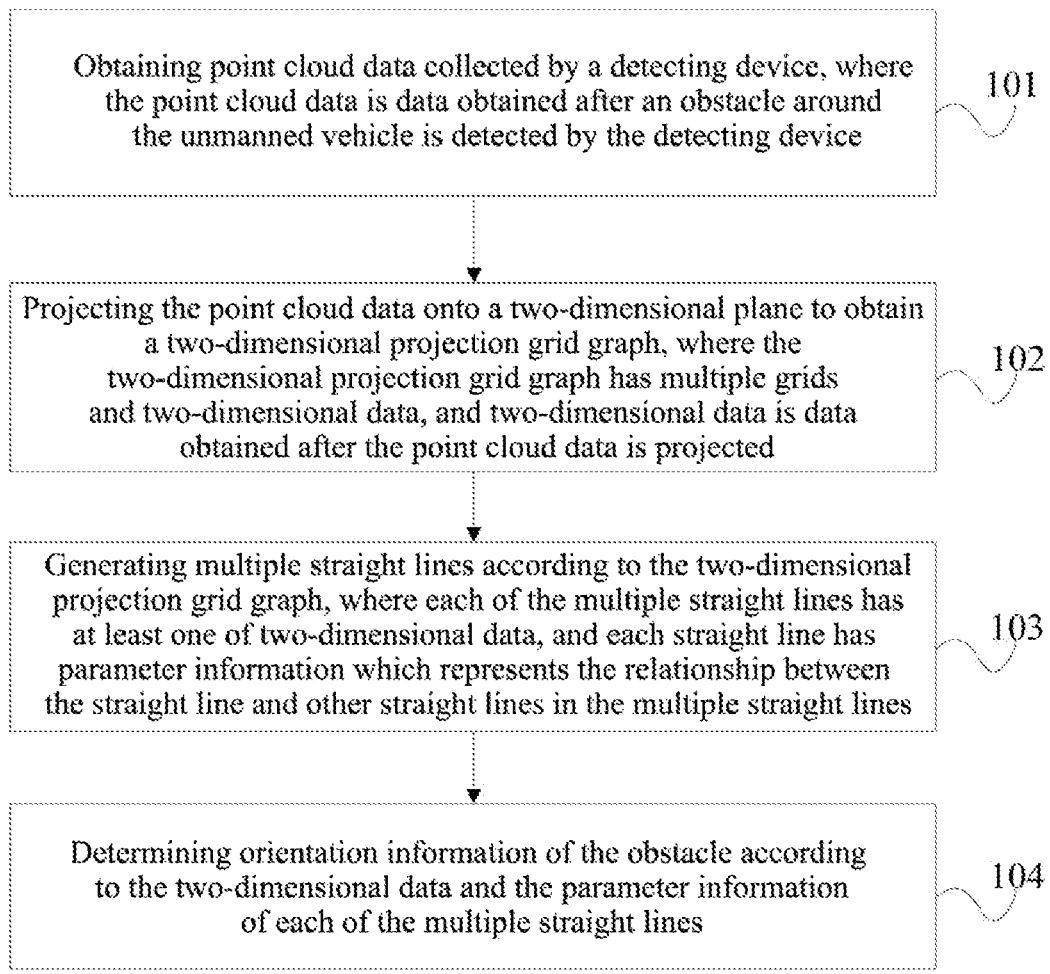
FIG. 1 is a flowchart of an obstacle detecting method based on an unmanned vehicle according to an embodiment of the present application.

FIG. 1 is a flowchart of an obstacle detecting method based on an unmanned vehicle according to an embodiment of the present application; as shown in FIG. 1, the executive body of the solution is a controller of the unmanned vehicle, a control device of the unmanned vehicle automatic driving system, and the like. The obstacle detecting method based on an unmanned vehicle includes:

Step 101: obtaining point cloud data collected by a detecting device, where the point cloud data is data obtained after an obstacle around the unmanned vehicle is detected by the detecting device.

In this step, specifically, the present embodiment is described with a controller of an unmanned vehicle taken as the executive body.

A detecting device is provided in the unmanned vehicle, and the detection device may be a device for example a laser radar or other radar. The detecting device detects an obstacle around the unmanned vehicle and obtains point cloud data.

The controller of the unmanned vehicle may obtain the point cloud data collected by the detecting device, where the point cloud data is three-dimensional data, and the three-dimensional coordinate system where the point cloud data is located is a three-dimensional coordinate system with the obstacle as an origin.

Step 102: projecting the point cloud data onto the two-dimensional plane to obtain a two-dimensional projection grid graph, where the two-dimensional projection grid graph has multiple grids and two-dimensional data, and two-dimensional data is the data obtained after the point cloud data is projected.

In this step, specifically, the controller of the unmanned vehicle projects the obtained point cloud data onto a two-dimensional plane, thereby transforming the point cloud data into two-dimensional data through the projection, and obtaining a two-dimensional projection grid graph which has the above two-dimensional data; and the two-dimensional projection grid graph is divided into multiple grids, where the dividing manner of the grid is not limited.

Step 103: generating multiple straight lines according to the two-dimensional projection grid graph, where each of the multiple straight lines has at least one of two-dimensional data, and each straight line has parameter information which represents the relationship between the straight line and other straight lines in the multiple straight lines.

In this step, specifically, since the two-dimensional projection grid graph has multiple grids and the grids have two-dimensional data thereon, the controller of the unmanned vehicle can generate multiple straight lines according to the two-dimensional data on the two-dimensional projection grid graph, where on each straight line there is at least one of two-dimensional data.

Since multiple straight lines are generated and the straight lines may intersect with each other, each straight line has positional relationships and connecting relationships with other straight lines; the positional relationship and the connecting relationship between each straight line and each of the other straight lines form the parameter information of the each straight line.

Step 104: determining orientation information of the obstacle according to the two-dimensional data and the parameter information of each of the multiple straight lines.

In this step, specifically, the controller of the unmanned vehicle can conduct a calculation according to the two-dimensional data and parameter information of each straight line, thereby determining the orientation information of the obstacle.

For example, the orientation information of the obstacle is obtained by weighted calculation of the two-dimensional data and the parameter information of each straight line, or the orientation information of the obstacle is obtained by calculation of the two-dimensional data and parameter information of each straight line by a classifier.

In this embodiment, by proposing the following steps: obtaining point cloud data collected by a detecting device, where the point cloud data is data obtained after an obstacle around the unmanned vehicle is detected by the detecting device; projecting the point cloud data onto a two-dimensional plane to obtain a two-dimensional projection grid graph, where the two-dimensional projection grid graph has multiple grids and two-dimensional data, and two-dimensional data is data obtained after the point cloud data is projected; generating multiple straight lines according to the two-dimensional projection grid graph, where each of the multiple straight lines has at least one of two-dimensional data, and each straight line has parameter information which represents the relationship between the straight line and other straight lines in the multiple straight lines; and determining orientation information of the obstacle according to the two-dimensional data and the parameter information of each of the multiple straight lines, a method for determining the orientation of an obstacle is provided, where a two-dimensional projection grid graph is obtained according to the point cloud data of the obstacle, and the orientation information of the obstacle is calculated according to the straight line obtained in the two-dimensional projection grid graph, which can therefore accurately determine the orientation of the obstacle around the unmanned vehicle and help the unmanned vehicle to keep clear of the obstacle.

Figure 2:
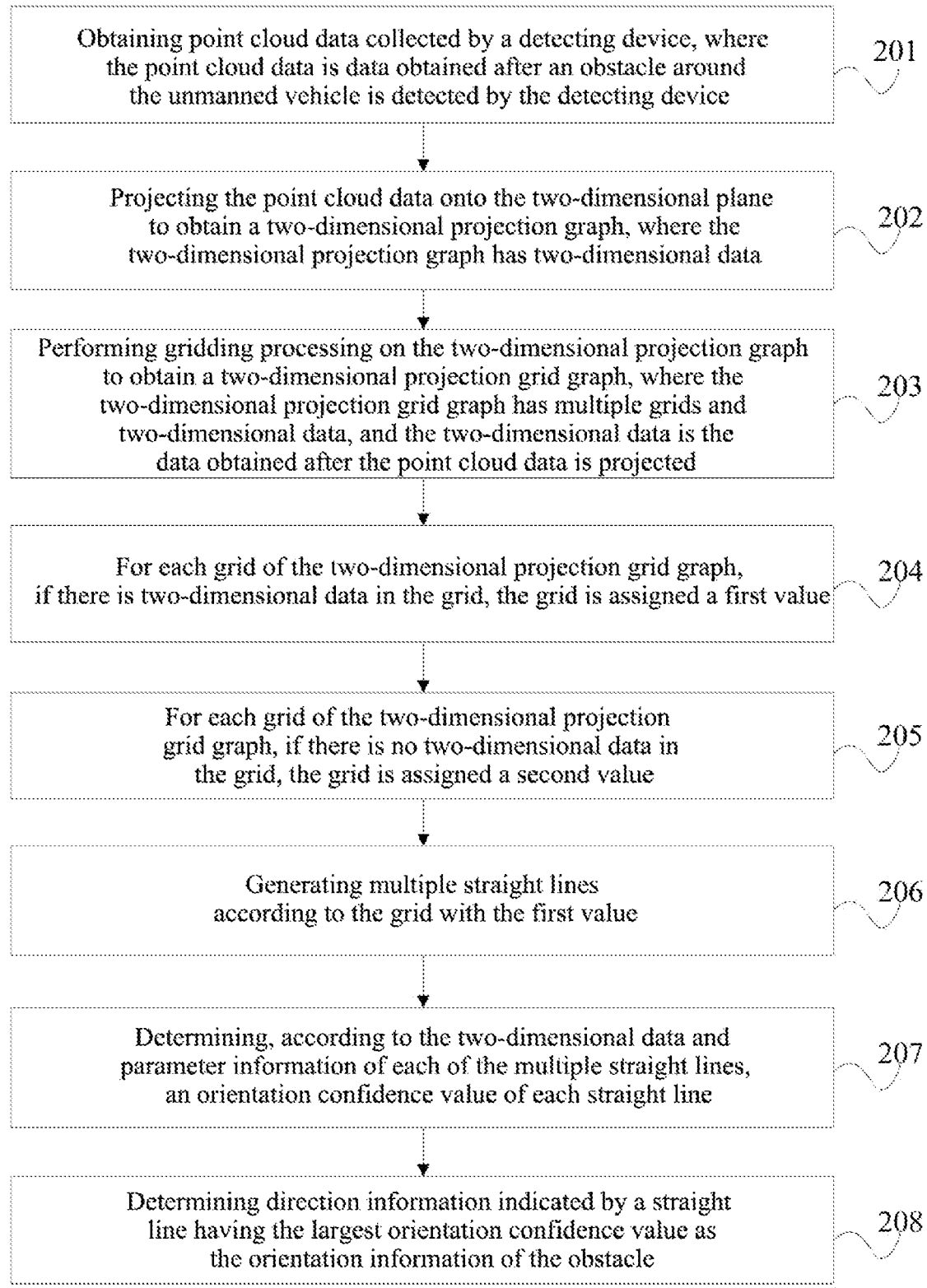
FIG. 2 is a flowchart of another obstacle detecting method based on an unmanned vehicle according to an embodiment of the present application.

FIG. 2 is a flowchart of another obstacle detecting method based on an unmanned vehicle according to an embodiment of the present application; as shown in FIG. 2, the executive body of the solution is a controller of the unmanned vehicle, a control device of the unmanned vehicle automatic driving system, and the like. The obstacle detecting method based on an unmanned vehicle includes:

Step 201: obtaining point cloud data collected by a detecting device, where the point cloud data is data obtained after an obstacle around the unmanned vehicle is detected by the detecting device.

In this step, specifically, the present embodiment is described with a controller of an unmanned vehicle as the executive body.

For this step, reference can be made to step 101 in FIG. 1, and no further details are provided.

Step 202: Projecting the point cloud data onto the two-dimensional plane to obtain a two-dimensional projection graph, where the two-dimensional projection graph has two-dimensional data.

In this step, specifically, the controller of the unmanned vehicle projects the point cloud data onto the two-dimensional plane to obtain a two-dimensional projection graph, where the two-dimensional projection graph includes two-dimensional data which is the data obtained after projection of cloud data is conducted, where the two-dimensional data is generally floating point data.

Step 203: performing gridding processing on the two-dimensional projection graph to obtain a two-dimensional projection grid graph, where the two-dimensional projection grid graph has multiple grids and two-dimensional data, and the two-dimensional data is the data obtained after the point cloud data is projected.

In this step, specifically, the controller of the unmanned vehicle performs gridding processing on the two-dimensional projection graph to obtain a gridded two-dimensional projection graph, that is, a two-dimensional projection grid graph.

Figure 3:
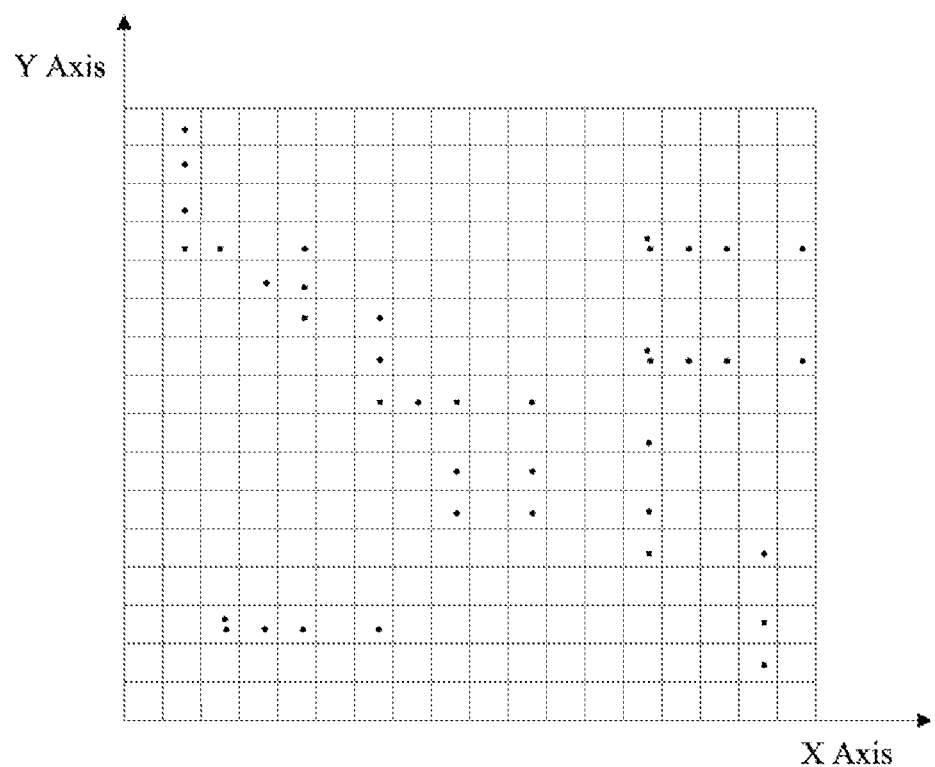
FIG. 3 is a schematic diagram of a two-dimensional projection grid graph in another obstacle detecting method based on an unmanned vehicle according to an embodiment of the present application.

FIG. 3 is a schematic diagram of a two-dimensional projection grid graph in another obstacle detecting method based on an unmanned vehicle according to an embodiment of the present application; as shown in FIG. 3, the two-dimensional projection grid graph has multiple grids and two-dimensional data which is located in the grids of the two-dimensional projection grid graph, and some grids have more than one piece of two-dimensional data.

Step 204: For each grid of the two-dimensional projection grid graph, if there is two-dimensional data in the grid, the grid is assigned a first value, where the step 204 specifically includes: for each grid of the two-dimensional projected grid graph, if there is the two-dimensional data in the grid, the grid is assigned the first value according to a number of two-dimensional data in the grid, where the number of two-dimensional data is proportional to the first value.

In this step, specifically, the controller of the unmanned vehicle determines whether there is two-dimensional data in each grid of the two-dimensional projection grid graph, and if there is two-dimensional data in the grid, the grid is assigned the first value.

Specifically, if there are multiple pieces of two-dimensional data in each grid of the two-dimensional projection grid graph, the grid is assigned the first value according to the number of two-dimensional data in the grid; where the more the number of dimensional data is, the larger the first value will be, and the first value is greater than 0 and less than or equal to N.

Step 205: for each grid of the two-dimensional projection grid graph, if there is no two-dimensional data in the grid, the grid is assigned a second value.

In this step, specifically, if there is no grid in the two-dimensional projection grid graph, the controller of the unmanned vehicle assigns the second value to the grid. The first value is different from the second value.

For example, if there is two-dimensional data in the grid of the two-dimensional projection grid graph, the controller of the unmanned vehicle assigns a value 1 to the grid; if there is no two-dimensional data in the grid of the two-dimensional projection grid graph, then the controller of the unmanned vehicle assigns a value 0 to the network.

For example, in the case that there is two-dimensional data in the grid of the two-dimensional projection grid graph, if the number of the piece of two-dimensional data in the gird is 1, the grid is assigned a value 1; if the number of the piece of two-dimensional data in the grid is 2, the grid is assigned a value 2; if the number of the piece of two-dimensional data in the grid is 3, the grid is assigned a value 3; and so on. If there is no two-dimensional data in the grid of the two-dimensional projection grid graph, the network is assigned a value 0.

Step 206: generating multiple straight lines according to the grid with the first value, where each of the multiple straight lines has at least one of two-dimensional data, and each straight line has parameter information which represents the relationship between the straight line and other straight lines in the multiple straight lines; and where step 206 includes the following implementation manners:

In the first embodiment of step 206, at least two grids with the first value are connected as a straight line to generate multiple straight lines.

In the second embodiment of step 206, Hough line detection is performed on the two-dimensional projection grid graph according to the grid with the first value, to obtain the multiple straight lines.

In this step, specifically, the controller of the unmanned vehicle generates multiple straight lines according to the grid with the first value.

Specifically, since the two points form a straight line, each of the two grids with the first value can be connected as a straight line; there are at least two grids on each straight line, and it thus can be seen that each of the straight lines has at least two pieces of two-dimensional data. Alternatively, a straight line is generated only according to the grid with the first value. In the process of generating the straight line, the Hough line detection is performed on the two-dimensional projection grid graph, and multiple straight lines can be obtained.

Figure 4:
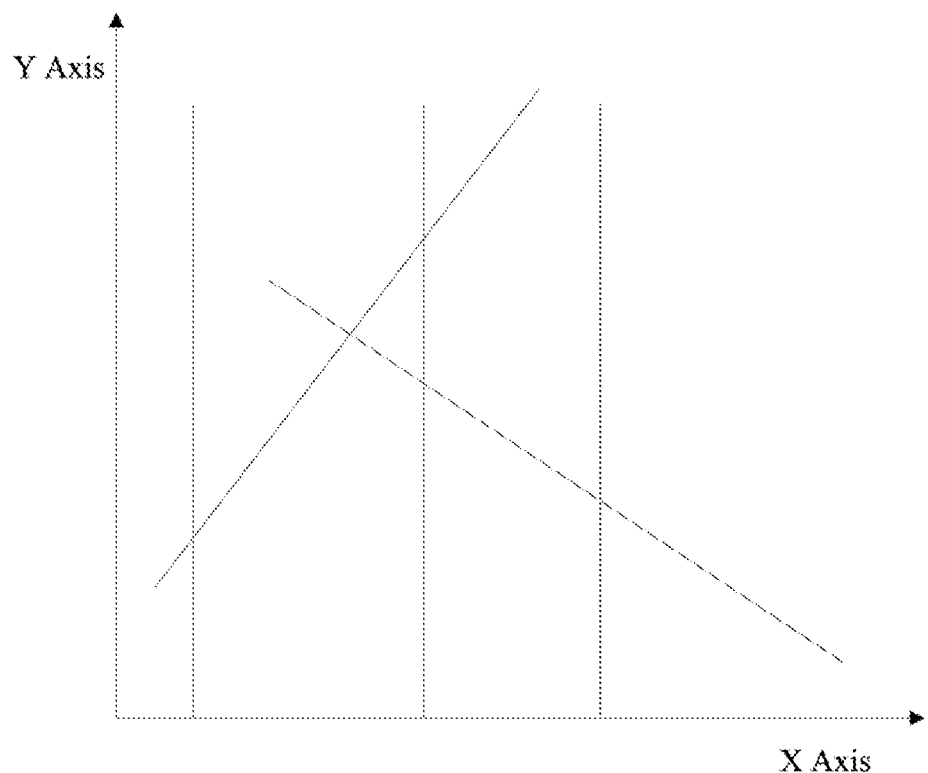
FIG. 4 is a schematic diagram of straight line in another obstacle detecting method based on an unmanned vehicle according to an embodiment of the present application.

For example, FIG. 4 is a schematic diagram of straight line in another obstacle detecting method based on an unmanned vehicle according to an embodiment of the present application; as shown in FIG. 4, 5 straight lines are generated.

Step 207: determining, according to the two-dimensional data and parameter information of each of the multiple straight lines, an orientation confidence value of each straight line, where step 207 specifically includes:

step 2071: determining, for each straight line, an intersecting straight line intersecting with the each straight line, where the parameter information of the each straight line is an angle and an intersection point between the each straight line and each intersecting straight line corresponding to the each straight line.

Step 2072: determining the angle parameter of the each straight line according to the angle values of all the angles of the each straight line.

Step 2073: determining a position parameter of each straight line according to position information of all intersecting points of the each straight line.

Step 2074: determining a distance between a first grid on the each straight line and the last grid on the each straight line as a distance parameter of the each straight line.

Step 2075: determining the orientation confidence value of the each straight line according to a number of two-dimensional data on the each straight line, the angle parameter, the position parameter, and the distance parameter.

In this step, specifically, as multiple straight lines are generated, each straight line has at least two pieces of two-dimensional data; since the straight lines may intersect with each other, each straight line has positional relationships and connecting relationships with other straight lines; the positional relationship and the connecting relationship between each straight line and each of the other straight lines form the parameter information of the each straight line. Therefore, for each straight line, the controller of the unmanned vehicle can determine the orientation confidence value of each straight line according to the two-dimensional data and parameter information of the each straight line.

Specifically, for each straight line, the controller of the unmanned vehicle determines all intersecting straight lines that intersect with the straight line. The straight line has an intersection point with each intersecting line, and the straight line has an angle with the intersecting line.

For each straight line, the controller of the unmanned vehicle determines an angle parameter according to the angle between the straight line and each intersecting line. Specifically, for each straight line, the controller of the unmanned vehicle performs a weighted summation on the angle values of all the angles between the straight line and each intersecting straight line to obtain an angle parameter of each straight line.

For each straight line, the controller of the unmanned vehicle determines the position parameter according to the position information of the intersection point of the straight line and each intersecting straight line. For example, the position information is the position of the intersection point in the two-dimensional projection graph. Specifically, for each straight line, the controller of the unmanned vehicle performs a weighted summation on the position information of all the intersection points between the straight line and each intersecting straight line to obtain the position parameter of the each straight line.

For each straight line, there are at least two grids along the direction of the line, the first grid on one end of the straight line, and the last grid on the other end of the straight line; the controller of the unmanned vehicle calculates the distance between the first grid and the last grid, to obtain the distance parameter of each straight line. Alternatively, for each straight line, there are at least two pieces of two-dimensional data along the straight line, the first piece of two-dimensional data on one end of the straight line, and the last piece of two-dimensional data on the other end of the straight line; the controller of the vehicle calculates the distance between the first piece of two-dimensional data and the last two-dimensional data to obtain the distance parameter of the each straight line.

There are at least two pieces of two-dimensional data on each straight line. Then, for each straight line, the controller of the unmanned vehicle calculates the orientation confidence value of the straight line according to the number of two-dimensional data on the straight line, the angle parameter, the position parameter, and the distance parameter. Specifically, for each straight line, the controller of the unmanned vehicle performs a weighted summation on the number of two-dimensional data on the straight line, the angle parameter, the position parameter, and the distance parameter to obtain the orientation confidence value of the straight line.

For example, the orientation confidence value of each straight line is score=$w_1$*Num+$w_2$*Pos+$w_3$*Angle+$w_1$*Length, where $w_1$、$w_2$、$w_3$、$w_4$ are the weighting coefficients, Num is the number of two-dimensional data on the straight line, Pos is the position parameter of the straight line, Angle is the angle parameter of the straight line, Length is a distance parameter of the straight line.

Step 208: determining direction information indicated by a straight line having the largest orientation confidence value as the orientation information of the obstacle.

In this step, specifically, the controller of the unmanned vehicle determines the direction indicated by the straight line having the largest orientation confidence value as the orientation information of the obstacle according to the orientation confidence value of each straight line, where the straight line has two directions, and either of them can be taken as the orientation of the obstacle.

In this embodiment, by proposing the following steps: obtaining point cloud data and projecting the point cloud data onto the two-dimensional plane to obtain a two-dimensional projection graph, where the two-dimensional projection graph includes two-dimensional data; performing gridding processing on the two-dimensional projection graph to obtain a gridded two-dimensional projection graph; assigning the a first value or a second value to the grid according to the two-dimensional data in each grid; generating multiple straight lines according to the grid with the first value; for each straight line, determining the angle parameter, the position parameter and the distance parameter; determining the orientation confidence value of the each straight line according to the number of two-dimensional data on the each straight line, the angle parameter, the position parameter, and the distance parameter; determining direction indicated by a straight line having the largest orientation confidence value as the orientation of the obstacle, a method for determining the orientation of an obstacle is provided, where a two-dimensional projection grid graph is obtained according to the point cloud data of the obstacle, and the orientation information of the obstacle is calculated according to the straight line obtained in the two-dimensional projection grid graph, which can therefore accurately determine the orientation of the obstacle around the unmanned vehicle and help the unmanned vehicle to keep clear of the obstacle.

Figure 5:
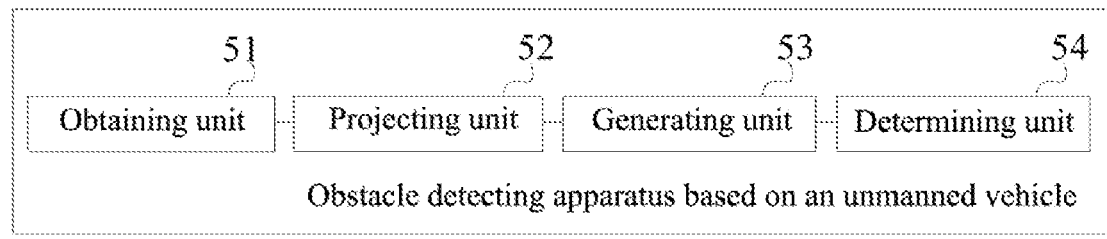
FIG. 5 is a schematic structural diagram of an obstacle detecting apparatus based on an unmanned vehicle according to an embodiment of the present application.

FIG. 5 is a schematic structural diagram of an obstacle detecting apparatus based on an unmanned vehicle according to an embodiment of the present application; as shown in FIG. 5, the obstacle detecting apparatus based on an unmanned vehicle according to the present embodiment includes:

an obtaining unit 51, configured to obtain point cloud data collected by a detecting device, where the point cloud data is data obtained after an obstacle around the unmanned vehicle is detected by the detecting device;

a projecting unit 52, configured to project the point cloud data onto the two-dimensional plane to obtain a two-dimensional projection grid graph, where the two-dimensional projection grid graph has multiple grids and two-dimensional data, and two-dimensional data is the data obtained after the point cloud data is projected;

a generating unit 53, configured to generate multiple straight lines according to the two-dimensional projection grid graph, where each of the multiple straight lines has at least one of two-dimensional data, and each straight line has parameter information which represents the relationship between the straight line and other straight lines in the multiple straight lines; and a determining unit 54, configured to determine orientation information of the obstacle according to the two-dimensional data and the parameter information of each of the multiple straight lines.

The obstacle detecting apparatus based on an unmanned vehicle according to the present embodiment is the same as the technical solution in the obstacle detecting method based on an unmanned vehicle provided by any of the foregoing embodiments, and the implementation principles thereof are similar, therefore details will not be described again.

In this embodiment, by proposing the following steps: obtaining point cloud data collected by a detecting device, where the point cloud data is data obtained after an obstacle around the unmanned vehicle is detected by the detecting device; projecting the point cloud data onto the two-dimensional plane to obtain a two-dimensional projection grid graph, where the two-dimensional projection grid graph has multiple grids and two-dimensional data, and two-dimensional data is the data obtained after the point cloud data is projected; generating multiple straight lines according to the two-dimensional projection grid graph, where each of the multiple straight lines has at least one of two-dimensional data, and each straight line has parameter information which represents the relationship between the straight line and other straight lines in the multiple straight lines; and determining orientation information of the obstacle according to the two-dimensional data and the parameter information of each of the multiple straight lines, a method for determining the orientation of an obstacle is provided, where a two-dimensional projection grid graph is obtained according to the point cloud data of the obstacle, and the orientation information of the obstacle is calculated according to the straight line obtained in the two-dimensional projection grid graph, which can therefore accurately determine the orientation of the obstacle around the unmanned vehicle and help the unmanned vehicle to keep clear of the obstacle.

Figure 6:
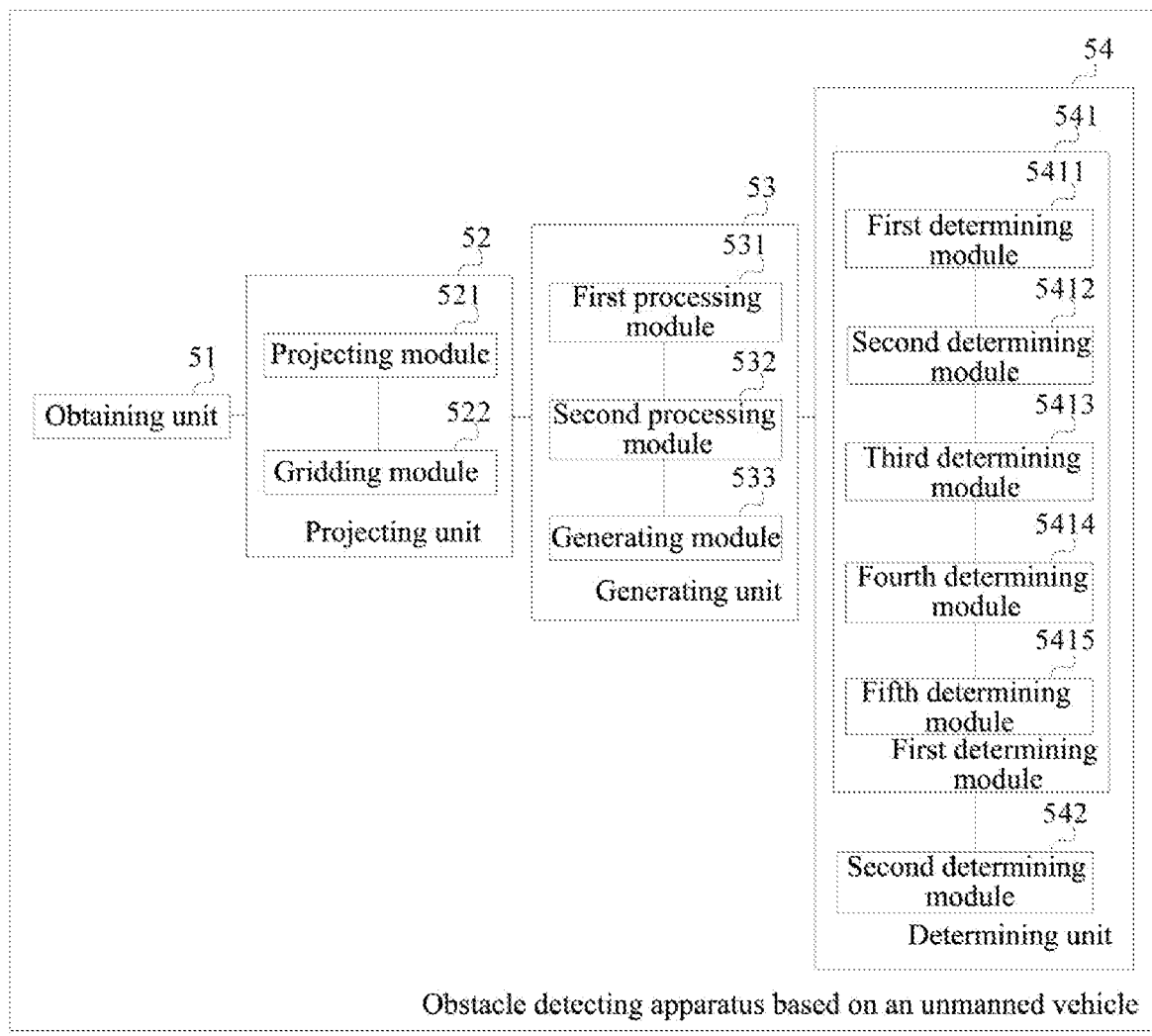
FIG. 6 is a schematic structural diagram of another obstacle detecting apparatus based on an unmanned vehicle according to an embodiment of the present application.

FIG. 6 is a schematic structural diagram of another obstacle detecting apparatus based on an unmanned vehicle according to an embodiment of the present application; and on the basis of the embodiment shown in FIG. 5, as shown in FIG. 6, in the obstacle detecting apparatus based on an unmanned vehicle provided by the embodiment, the projection unit 52 includes:

a projecting module 521, configured to project the point cloud data onto the two-dimensional plane to obtain a two-dimensional projection graph, where the two-dimensional projection graph has two-dimensional data;

a gridding module 522, configured to perform gridding processing on the two-dimensional projection graph to obtain a two-dimensional projection grid graph;

the generating unit 53 includes:

a first processing module 531, configured to, for each grid of the two-dimensional projection grid graph, if there is two-dimensional data in the grid, assign the grid a first value, a second processing module 532, configured to for each grid of the two-dimensional projection grid graph, if there is no two-dimensional data in the grid, assign the grid a second value; and a generating module 533, configured to generate multiple straight lines according to the grid with the first value.

The first processing module 531 is specifically configured to: for each grid of the two-dimensional projected grid graph, if there is the two-dimensional data in the grid, assign the grid a first value according to a number of two-dimensional data in the grid, where the number of two-dimensional data is proportional to the first value.

The generating module 533 is specifically configured to connect at least two grids with the first value as a straight line to generate multiple straight lines. Alternatively, the generating module 533 is specifically configured to perform Hough line detection on the two-dimensional projection grid graph according to the grid with the first value, to obtain the multiple straight lines.

the determining unit 54 includes:

a first determining module 541, configured to determine, according to the two-dimensional data and parameter information of each of the multiple straight lines, the orientation confidence value of each straight line, a second determining module 542, configured to determine direction information indicated by a straight line having the largest orientation confidence value as the orientation information of the obstacle.

the first determining module 541 includes:

a first determining submodule 5411, configured to determine, for each straight line, an intersecting straight line intersecting with the each straight line, where the parameter information of the each straight line is an angle and an intersection point between the each straight line and each intersecting straight line corresponding to the each straight line;

a second determining submodule 5412, configured to determine an angle parameter of each straight line according to angle values of all angles of the each straight line;

a third determining submodule 5413, configured to determine a position parameter of each straight line according to position information of all intersecting points of the each straight line;

a fourth determining submodule 5414, configured to determine a distance between a first grid on each straight line and the last grid on the each straight line as a distance parameter of the each straight line; and a fifth determining submodule 5415, configured to determine the orientation confidence value of each line according to a number of the piece of two-dimensional data on the each straight line, the angle parameter, the position parameter, and the distance parameter.

The second determining submodule 5412 is specifically configured to obtain an angle parameter of each straight line by performing a weighted summation on angle values of all angles of the each straight line.

The third determining submodule 5413 is specifically configured to obtain a position parameter of each straight line by performing a weighted summation on the position information of all the intersecting points of the each straight line.

The fifth determining submodule 5415 is specifically configured to obtain the orientation confidence value of the each straight line by performing a weighted summation on the number of two-dimensional data on the each straight line, the angle parameter, the position parameter, and the distance parameter;

The obstacle detecting apparatus based on an unmanned vehicle according to the present embodiment is the same as the technical solution in the obstacle detecting methods based on an unmanned vehicle provided by any of the foregoing embodiments, and the implementation principles thereof are similar, therefore details will not be described again.

In this embodiment, by proposing the following steps: obtaining point cloud data and projecting the point cloud data onto the two-dimensional plane to obtain a two-dimensional projection graph, where the two-dimensional projection graph includes two-dimensional data; performing gridding processing on the two-dimensional projection graph to obtain a gridded two-dimensional projection graph; assigning the a first value or a second value to the grid according to the two-dimensional data in each grid; generating multiple straight lines according to the grid with the first value; for each straight line, determining the angle parameter, the position parameter and the distance parameter; determining the orientation confidence value of each straight line according to the number of the piece of two-dimensional data on the each straight line, the angle parameter, the position parameter, and the distance parameter; determining direction indicated by a straight line having the largest orientation confidence value as the orientation of the obstacle, a method for determining the orientation of an obstacle is provided, where a two-dimensional projection grid graph is obtained according to the point cloud data of the obstacle, and the orientation information of the obstacle is calculated according to the straight line obtained in the two-dimensional projection grid graph, which can therefore accurately determine the orientation of the obstacle around the unmanned vehicle and help the unmanned vehicle to keep clear of the obstacle.

Figure 7:
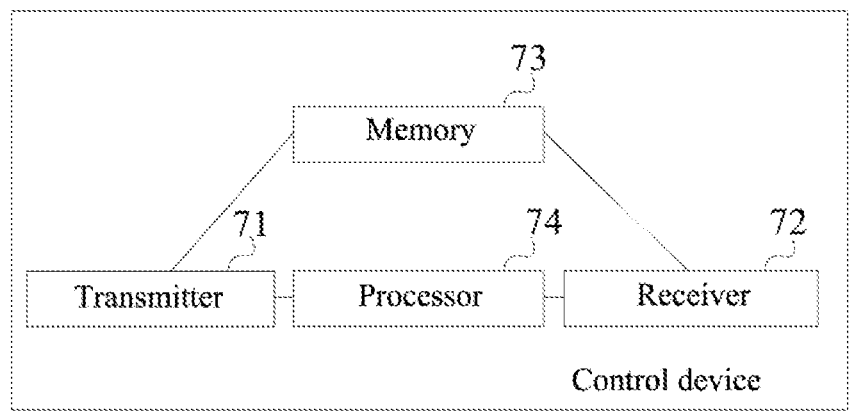
FIG. 7 is a schematic structural diagram of a control device according to an embodiment of the present application.

FIG. 7 is a schematic structural diagram of a control device according to an embodiment of the present application. As shown in FIG. 7, the control device includes: a transmitter 71, a receiver 72, a memory 73, and a processor 74;

the memory 73 is configured to store computer instructions; the processor 74 is configured to execute the computer instructions stored in the memory 73 to implement the technical solution of the obstacle detecting method based on an unmanned vehicle provided by any of the foregoing embodiments.

The present application further provides a storage medium, including: a readable storage medium and computer instructions, the computer instructions being stored in a readable storage medium; the computer instruction is used to implement the technical solution of the obstacle detecting method based on an unmanned vehicle of any of the implementations provided in the foregoing examples.

In the specific implementation of the foregoing control device, it should be understood that the processor 74 may be a central processing unit (CPU for short), or may be other general-purpose processors, a digital signal processor (DSP for short), an application specific integrated circuit (ASIC for short) or the like. The general purpose processor may be a microprocessor. Alternatively the processor may be any conventional processor or the like. The steps of the method disclosed in combination of the embodiments of the present application may be directly implemented by a hardware processor, or may be implemented by a combination of hardware and software modules in the processor.

One of ordinary skill in the art will appreciate that all or part of the steps to implement the various method embodiments described above may be accomplished by hardware associated with the program instructions. The foregoing program may be stored in a computer readable storage medium. When the program is executed, the steps included in the foregoing method embodiments are performed; and the foregoing storage medium includes: a read-only memory (ROM for short), an RAM, a flash memory, a hard disk, a solid state hard disk, a magnetic tape, a floppy disk, an optical disc and any combination thereof.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all technical features thereof, without departing from the scope of the technical solutions of embodiments of the present application.

What is claimed is:

1. An obstacle detecting method based on an unmanned vehicle, comprising:
    obtaining point cloud data collected by a detecting device, wherein the point cloud data is data obtained after an obstacle around the unmanned vehicle is detected by the detecting device;
    projecting the point cloud data onto a two-dimensional plane to obtain a two-dimensional projection grid graph, wherein the two-dimensional projection grid graph has multiple grids and two-dimensional data, and the two-dimensional data is data obtained after the point cloud data is projected;
    generating multiple straight lines according to the two-dimensional projection grid graph, wherein each of the multiple straight lines has at least one of two-dimensional data, and the each straight line has parameter information which represents a relationship between the straight line and other straight lines in the multiple straight lines; and
    determining orientation information of the obstacle according to the two-dimensional data and the parameter information of the each of the multiple straight lines;
    wherein the generating multiple straight lines according to the two-dimensional projection grid graph comprises:
    for each grid of the two-dimensional projection grid graph, if there is two-dimensional data in the grid, assigning the grid a first value;
    for each grid of the two-dimensional projection grid graph, if there is no two-dimensional data in the grid, assigning the grid a second value; and
    generating the multiple straight lines according to the grid with the first value.

2. The method according to claim 1, wherein the projecting the point cloud data onto a two-dimensional plane to obtain a two-dimensional projection grid graph comprises:
    projecting the point cloud data onto the two-dimensional plane to obtain a two-dimensional projection graph, wherein the two-dimensional projection graph has the two-dimensional data;
    performing gridding processing on the two-dimensional projection graph to obtain the two-dimensional projection grid graph.

3. The method according to claim 1, wherein the for each grid of the two-dimensional projection grid graph, if there is two-dimensional data in the grid, assigning the grid a first value comprises:
    for each grid of the two-dimensional projected grid graph, if there is the two-dimensional data in the grid, assigning the grid the first value according to a number of two-dimensional data in the grid, wherein the number of two-dimensional data is proportional to the first value.

4. The method according to claim 1, wherein the generating the multiple straight lines according to the grid with the first value comprises:
    connecting at least two grids with the first value as a straight line to generate the multiple straight lines.

5. The method according to claim 1, wherein the generating the multiple straight lines according to the grid with the first value comprises:
    performing Hough line detection on the two-dimensional projection grid graph according to the grid with the first value, to obtain the multiple straight lines.

6. The method according to claim 1, wherein the determining orientation information of the obstacle according to the two-dimensional data and the parameter information of the each of the multiple straight lines comprises:
    determining, according to the two-dimensional data and parameter information of the each of the multiple straight lines, an orientation confidence value of the each straight line; and
    determining direction information indicated by a straight line having a largest orientation confidence value as the orientation information of the obstacle.

7. The method according to claim 6, wherein the determining, according to the two-dimensional data and parameter information of the each of the multiple straight lines, an orientation confidence value of the each straight line comprises:
    determining, for the each straight line, an intersecting straight line intersecting with the each straight line, wherein the parameter information of the each straight line is an angle and an intersection point between the each straight line and each intersecting straight line corresponding to the each straight line; and
    determining an angle parameter of the each straight line according to angle values of all angles of the each straight line;
    determining a position parameter of the each straight line according to position information of all intersecting points of the each straight line;
    determining a distance between a first grid on the each straight line and the last grid on the each straight line as a distance parameter of the each straight line; and
    determining the orientation confidence value of the each straight line according to the number of two-dimensional data on the each straight line, the angle parameter, the position parameter, and the distance parameter.

8. The method according to claim 7, wherein the determining an angle parameter of the each straight line according to angle values of all angles of the each straight line comprises:

obtaining the angle parameter of the each straight line by performing a weighted summation on the angle values of all the angles of the each straight line.

9. The method according to claim 7, wherein the determining a position parameter of the each straight line according to position information of all intersecting points of the each straight line comprises:

obtaining the position parameter of the each straight line by performing a weighted summation on the position information of all the intersecting points of the each straight line.

10. The method according to claim 7, wherein the determining the orientation confidence value of the each straight line according to the number of two-dimensional data on the each straight line, the angle parameter, the position parameter, and the distance parameter comprises:

obtaining the orientation confidence value of the each straight line by performing a weighted summation on the number of two-dimensional data on the each straight line, the angle parameter, the position parameter, and the distance parameter.

11. An obstacle detecting apparatus based on an unmanned vehicle, comprising: a processor and a computer readable medium for storing program codes, which, when executed by the processor, cause the processor to:

obtain point cloud data collected by a detecting device, wherein the point cloud data is data obtained after an obstacle around the unmanned vehicle is detected by the detecting device;

project the point cloud data onto a two-dimensional plane to obtain a two-dimensional projection grid graph, wherein the two-dimensional projection grid graph has multiple grids and two-dimensional data, and the two-dimensional data is data obtained after the point cloud data is projected;

generate multiple straight lines according to the two-dimensional projection grid graph, wherein each of the multiple straight lines has at least one of two-dimensional data, and the each straight line has parameter information which represents a relationship between the straight line and other straight lines in the multiple straight lines; and determine orientation information of the obstacle according to the two-dimensional data and the parameter information of the each of the multiple straight lines;

wherein the program codes further cause the processor to:

for each grid of the two-dimensional projection grid graph, if there is two-dimensional data in the grid, assign the grid a first value;

for each grid of the two-dimensional projection grid graph, if there is no two-dimensional data in the grid, assign the grid a second value; and generate the multiple straight lines according to the grid with the first value.

12. The apparatus according to claim 11, wherein the program codes further cause the processor to: project the point cloud data onto the two-dimensional plane to obtain a two-dimensional projection graph, wherein the two-dimensional projection graph has the two-dimensional data; and perform gridding processing on the two-dimensional projection graph to obtain the two-dimensional projection grid graph.

13. The apparatus according to claim 11, wherein the program codes further cause the processor to:

for each grid of the two-dimensional projected grid graph, if there is the two-dimensional data in the grid, assign the grid the first value according to a number of two-dimensional data in the grid, wherein the number of two-dimensional data is proportional to the first value.

14. The apparatus according to claim 11, wherein the program codes further cause the processor to: connect at least two grids with the first value as a straight line to generate the multiple straight lines.

15. The apparatus according to claim 11, wherein the program codes further cause the processor to: perform Hough line detection on the two-dimensional projection grid graph according to the grid with the first value, to obtain the multiple straight lines.

16. The apparatus according to claim 11, wherein the program codes further cause the processor to: determine, according to the two-dimensional data and parameter information of the each of the multiple straight lines, an orientation confidence value of the each straight line; and determine direction information indicated by a straight line having a largest orientation confidence value as the orientation information of the obstacle.

17. The apparatus according to claim 16, wherein the program codes further cause the processor to: determine, for the each straight line, an intersecting straight line intersecting with the each straight line, wherein the parameter information of the each straight line is an angle and an intersection point between the each straight line and each intersecting straight line corresponding to the each straight line; and determine an angle parameter of the each straight line according to angle values of all angles of the each straight line; and determine a position parameter of the each straight line according to position information of all intersecting points of the each straight line;

determine a distance between a first grid on the each straight line and the last grid on the each straight line as a distance parameter of the each straight line; and determine the orientation confidence value of the each straight line according to the number of two-dimensional data on the each straight line, the angle parameter, the position parameter, and the distance parameter.

18. The apparatus according to claim 17, wherein the program codes further cause the processor to:

obtain the angle parameter of the each straight line by performing a weighted summation on the angle values of all the angles of the each straight line; or obtain the position parameter of the each straight line by performing a weighted summation on the position information of all the intersecting points of the each straight line; or obtain the orientation confidence value of the each straight line by performing a weighted summation on the number of two-dimensional data on the each straight line, the angle parameter, the position parameter, and the distance parameter.

* * * * *